United States Patent
Zhou et al.

(10) Patent No.: US 9,836,661 B2
(45) Date of Patent: Dec. 5, 2017

(54) SYSTEM AND METHOD FOR COLLISION AVOIDANCE

(71) Applicant: General Electric Company, Schenectady, NY (US)

(72) Inventors: Zhi Zhou, Selkirk, NY (US); Narendra Digamber Joshi, Guilderland, NY (US); Rui Zhou, Niskayuna, NY (US); Craig Hoover, Grand Rapids, MI (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 14/560,311

(22) Filed: Dec. 4, 2014

(65) Prior Publication Data

US 2016/0163208 A1   Jun. 9, 2016

(51) Int. Cl.
| | |
|---|---|
| G08G 5/04 | (2006.01) |
| G06K 9/00 | (2006.01) |
| G08G 5/00 | (2006.01) |
| G08G 5/06 | (2006.01) |
| B64F 1/22 | (2006.01) |

(52) U.S. Cl.
CPC .......... *G06K 9/00805* (2013.01); *B64F 1/228* (2013.01); *G08G 5/0013* (2013.01); *G08G 5/0021* (2013.01); *G08G 5/0026* (2013.01); *G08G 5/0082* (2013.01); *G08G 5/045* (2013.01); *G08G 5/065* (2013.01); *Y02T 50/826* (2013.01)

(58) Field of Classification Search
None
See application file for complete search history.

(56) References Cited

U.S. PATENT DOCUMENTS

| | | | | |
|---|---|---|---|---|
| 4,710,774 | A | | 12/1987 | Gunny |
| 4,722,175 | A | * | 2/1988 | Hobhouse ............ A01D 51/002 56/327.1 |
| 4,905,151 | A | * | 2/1990 | Weiman ............... G05D 1/0253 180/167 |
| 4,918,442 | A | | 4/1990 | Bogart |
| 5,555,503 | A | * | 9/1996 | Kyrtsos .................. G08G 1/202 342/357.24 |
| 5,612,883 | A | * | 3/1997 | Shaffer ............. B60K 31/0008 340/435 |

(Continued)

FOREIGN PATENT DOCUMENTS

| | | |
|---|---|---|
| DE | EP 2603411 A1 * | 6/2013 |
| EP | 2400272 A2 * | 12/2011 ........... G08G 5/0021 |

OTHER PUBLICATIONS

Lacey et al., "WingWatch : Aircraft Ground Collision Avoidance System", URL : https://www.scss.tcd.ie/Gerard.Lacey/Gerard_Lacey_Homepage/WingWatch_files/WingWatch%20Overview.pdf downloaded on Dec. 3, 2014, 11 pages.

*Primary Examiner* — Jean-Paul Cass
(74) *Attorney, Agent, or Firm* — Nitin N. Joshi

(57) ABSTRACT

A method implemented using at least one processor includes receiving a plurality of images acquired from a plurality of image sensors disposed on a vehicle configured to engage an aircraft for ground operations. The method further includes determining at least one parameter about a potential obstacle based on the plurality of images and a machine vision algorithm. The method also includes generating an alert signal based on the at least one parameter, useful for avoiding collision of the aircraft.

18 Claims, 8 Drawing Sheets

(56) References Cited

U.S. PATENT DOCUMENTS

| | | | |
|---|---|---|---|
| 5,706,273 A * | 1/1998 | Guerreri | B67D 7/08 |
| | | | 700/283 |
| 6,118,401 A | 9/2000 | Tognazzini | |
| 6,246,320 B1 | 6/2001 | Monroe | |
| 6,405,975 B1 | 6/2002 | Sankrithi et al. | |
| 6,850,252 B1 * | 2/2005 | Hoffberg | G06K 9/00369 |
| | | | 348/E7.061 |
| 6,868,309 B1 * | 3/2005 | Begelman | G06F 19/3481 |
| | | | 422/107 |
| 7,254,140 B1 * | 8/2007 | Rokhsaz | H04L 12/5692 |
| | | | 370/401 |
| 7,437,250 B2 * | 10/2008 | Breen | E01C 23/00 |
| | | | 404/17 |
| 7,523,215 B1 * | 4/2009 | Robinson | H04L 69/24 |
| | | | 709/235 |
| 7,667,647 B2 * | 2/2010 | Breen | G01S 5/0221 |
| | | | 342/450 |
| 8,046,501 B2 * | 10/2011 | Gormley | G05B 19/0421 |
| | | | 710/15 |
| 8,417,490 B1 * | 4/2013 | Preston | G06F 17/5095 |
| | | | 701/114 |
| 8,464,227 B2 * | 6/2013 | Clinton | G05B 23/0213 |
| | | | 717/110 |
| 8,499,307 B2 * | 7/2013 | Resnick | G06F 9/4448 |
| | | | 700/9 |
| 8,509,965 B2 * | 8/2013 | Lin | G01C 21/165 |
| | | | 340/961 |
| 8,594,814 B2 * | 11/2013 | Rovaglio | G05B 17/02 |
| | | | 345/419 |
| 9,141,113 B1 * | 9/2015 | Ivanov | G05D 1/0676 |
| 2003/0025614 A1 | 2/2003 | Kahn | |
| 2003/0209893 A1 * | 11/2003 | Breed | B60J 10/00 |
| | | | 280/735 |
| 2005/0056699 A1 * | 3/2005 | Meier | G06K 7/10722 |
| | | | 235/454 |
| 2005/0156777 A1 * | 7/2005 | King | G01S 3/023 |
| | | | 342/29 |
| 2006/0167784 A1 * | 7/2006 | Hoffberg | G06Q 20/401 |
| | | | 705/37 |
| 2007/0027612 A1 * | 2/2007 | Barfoot | G05D 1/0297 |
| | | | 701/117 |
| 2007/0087756 A1 * | 4/2007 | Hoffberg | G06Q 10/0631 |
| | | | 455/450 |
| 2008/0062011 A1 * | 3/2008 | Butler | G01S 3/783 |
| | | | 340/961 |
| 2008/0144944 A1 * | 6/2008 | Breed | G06K 9/00832 |
| | | | 382/224 |
| 2009/0082880 A1 * | 3/2009 | Saunders | G05B 15/02 |
| | | | 700/9 |
| 2009/0222677 A1 * | 9/2009 | Astigarraga | G06F 11/2007 |
| | | | 713/300 |
| 2009/0295622 A1 | 12/2009 | Anderson et al. | |
| 2010/0134320 A1 * | 6/2010 | Chevion | G08G 1/164 |
| | | | 340/932 |
| 2010/0241291 A1 | 9/2010 | Konya | |
| 2010/0253594 A1 * | 10/2010 | Szczerba | G01S 13/723 |
| | | | 345/7 |
| 2010/0292871 A1 | 11/2010 | Schultz et al. | |
| 2010/0292886 A1 * | 11/2010 | Szczerba | G01C 21/365 |
| | | | 701/31.4 |
| 2010/0317420 A1 * | 12/2010 | Hoffberg | G06Q 30/0207 |
| | | | 463/1 |
| 2011/0066262 A1 * | 3/2011 | Kelly | G05B 23/0267 |
| | | | 700/90 |
| 2011/0173146 A1 * | 7/2011 | Hnatio | G06Q 10/06 |
| | | | 706/14 |
| 2011/0298603 A1 * | 12/2011 | King | G08G 1/164 |
| | | | 340/436 |
| 2012/0060030 A1 * | 3/2012 | Lamb | H04L 63/0876 |
| | | | 713/166 |
| 2012/0095619 A1 * | 4/2012 | Pack | G05D 1/0038 |
| | | | 701/2 |
| 2013/0297102 A1 | 11/2013 | Hughes et al. | |
| 2013/0321169 A1 | 12/2013 | Bateman et al. | |
| 2014/0022051 A1 * | 1/2014 | Levien | G05D 1/0011 |
| | | | 340/5.2 |
| 2014/0142838 A1 | 5/2014 | Durand | |
| 2015/0106346 A1 * | 4/2015 | Grove | G06F 17/30309 |
| | | | 707/695 |
| 2015/0170503 A1 * | 6/2015 | Wedig | G08B 7/066 |
| | | | 340/691.5 |
| 2016/0159497 A1 * | 6/2016 | Zhou | B64F 1/227 |
| | | | 307/9.1 |
| 2016/0161947 A1 * | 6/2016 | Liao | G05D 1/0027 |
| | | | 701/2 |
| 2016/0163208 A1 * | 6/2016 | Zhou | G08G 5/0021 |
| | | | 701/301 |
| 2016/0163209 A1 * | 6/2016 | Zhou | G08G 5/065 |
| | | | 701/117 |
| 2016/0259939 A1 * | 9/2016 | Bobritsky | G06F 17/30424 |

* cited by examiner

SYSTEM AND METHOD FOR COLLISION AVOIDANCE

BACKGROUND

A system and method are disclosed for management of ground operation of an aircraft. Specifically, disclosed techniques are related to collision avoidance, cost effective energy management, and fleet management of aircrafts during ground operation.

During taxiing around an airport, collisions may occur between an aircraft and other ground objects such as gate, service vehicles or other aircrafts. According to one estimate, the ground damage to the world's airliners is nearly about $4 billion every year. For corporate fleets, the damage was estimated to be $1 billion annually. The ground damage include direct costs resulting from material and work related to an accident, and indirect costs resulting from aircraft being not in operation, harming the public image of airliner, and incident investigations. The main causes of surface accidents identified from the historical database include the failure to maintain adequate visual lookout, the failure to perceive distance between the wings and obstacles, and the failure to maintain required clearance.

To avoid collisions, cockpit viewing units are assembled in the aircraft so that the crew members have knowledge of their environment. The cockpit viewing units receive surveillance and monitoring information through a broadcast and present it to the crew in a suitable format. Availability of such information allows the crew to remain vigilant and reduce the collision incidents in the airport. However, in many situations, the assessment about separation of the aircraft with fuselage of another aircraft or a ground vehicle or an object lacks finer details. Attempts to maneuver of aircrafts based on such an assessment may lead to collisions.

Management of a fleet of aircrafts in an airport requires additional information about crowding of aircrafts on runways, and status of other moving vehicles. Optimizing the movement of the fleet of aircrafts with varying arrival, and departure times requires ability to monitor and control relative motion of various vehicles operating from the airport. Movement of aircrafts during ground operation using aircraft engine has many disadvantages. Aircraft engine operation requires high quality costly fuel. The dust and debris on the ground may be sucked by the aircraft engine during taxiing and the aircraft engine may be damaged.

Aircraft power requirements such as cabin lighting, and air-conditioning are provided by operating air craft engine or by auxiliary power sources on the aircraft. Conventional methods of supporting auxiliary loads of the aircraft are costly, and not elegant from environmental considerations. Proposals for providing alternate power sources to meet power requirement for the aircraft are available but these proposals may not be optimal when the aircraft is stationary and during taxiing.

Improved techniques for management of ground operation of a fleet of aircrafts, viz., collision avoidance of aircrafts, traffic management of the fleet of aircrafts, and power management of aircrafts, are required.

BRIEF DESCRIPTION

In accordance with one aspect of the present technique, a method is disclosed. The method includes receiving a plurality of images acquired from a plurality of image sensors disposed on a vehicle configured to engage an aircraft for ground operations. The method further includes determining at least one parameter about a potential obstacle based on the plurality of images and a machine vision algorithm. The method also includes generating an alert signal based on the at least one parameter, useful for avoiding collision of the aircraft.

In accordance with another aspect of the present technique, a system is disclosed. The system includes at least one processor and a memory communicatively coupled to the at least one processor via a communications link. The system further includes a plurality of sensors disposed at a plurality of locations on a vehicle, wherein the plurality of sensors comprise a plurality of image sensors and the vehicle is configured to engage an aircraft for ground operation. The system also includes a data acquisition module communicatively coupled to the plurality of sensors that receives a plurality of images from the plurality of image sensors. The system further includes a collision avoidance module communicatively coupled to the data acquisition module and that determines at least one parameter about a potential obstacle based on the plurality of images and a machine vision algorithm. The collision avoidance module also generates an alert signal based on the at least one parameter, useful for avoiding collision of the aircraft. At least one of the data acquisition module and the collision avoidance module is stored in the memory and executable by the at least one processor.

DRAWINGS

These and other features and aspects of the present technology will become better understood when the following detailed description is read with reference to the accompanying drawings in which like characters represent like parts throughout the drawings, wherein.

DETAILED DESCRIPTION

Figure 1:
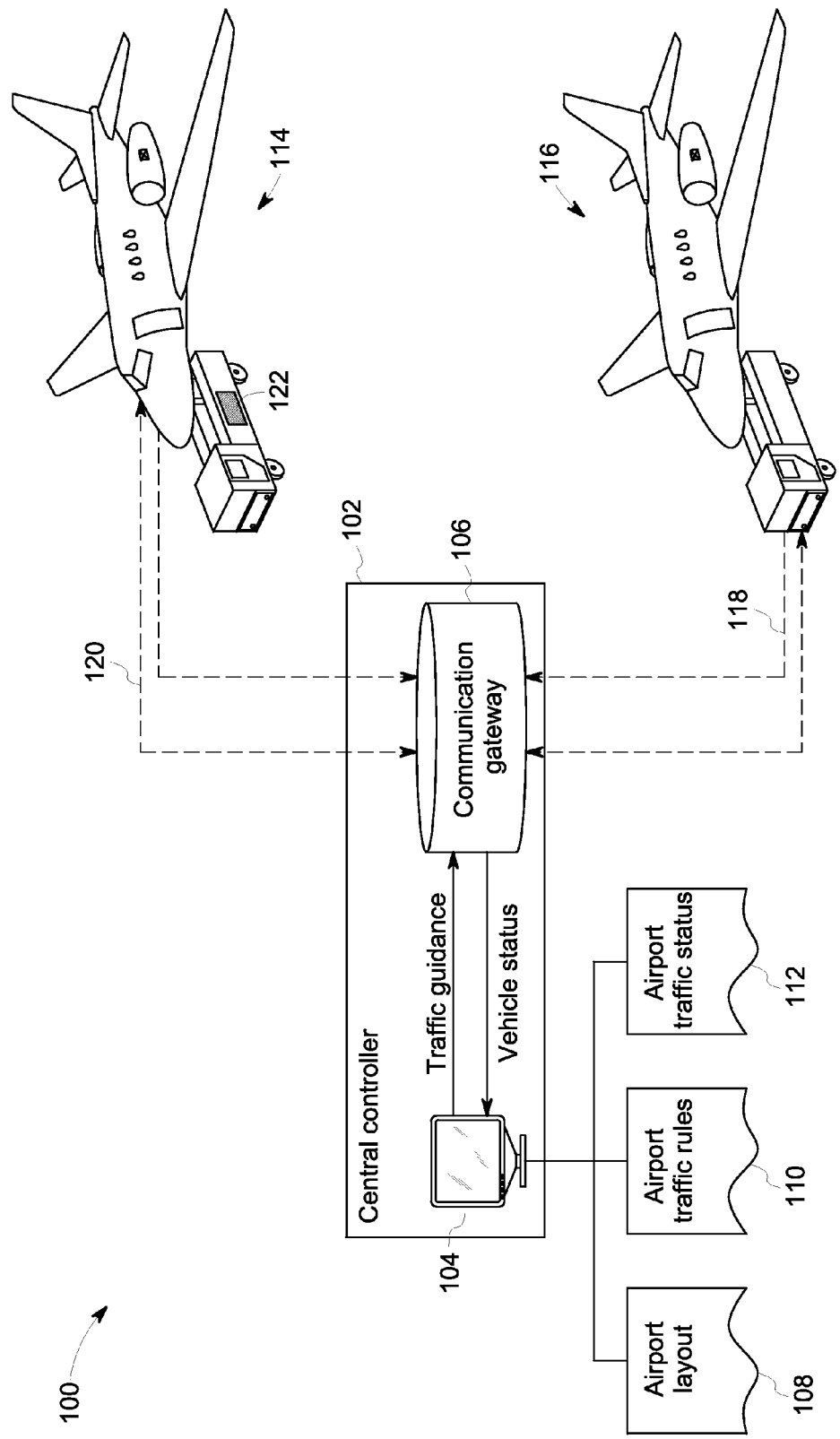
FIG. 1 is a schematic of a system for management of ground operation of an aircraft in accordance with an exemplary embodiment.

Embodiments of a method and a system for aircraft ground management employ a plurality of sensors disposed on a vehicle for acquiring sensor data. The vehicle is configured to engage an aircraft for ground operation of the aircraft. Machine vision techniques are used to process the sensor data to determine a potential obstacle to the aircraft. An alert signal useful for avoiding collision of the aircraft is generated based on the processing. A supervisory system acquiring a plurality of environmental parameters is deployed in the airport to monitor movement of a fleet of aircrafts. A plurality of contextual parameters representative of the status of the vehicle are determined based on the sensor data and the plurality of environmental parameters. A plurality of control parameters are generated based on the plurality of environmental parameters and the plurality of contextual parameters. At least one of the plurality of control parameters is provided to a taxi controller of the aircraft.

The aircraft may be provided with alternative power using a power source fitted in the vehicle. Power management of the aircraft is performed when the aircraft is stationary at the gate or during taxiing before takeoff and after landing. The aircraft power management includes connecting the power source to auxiliary loads of the aircraft via an auxiliary power source (APS) of the aircraft and disconnecting the power source from the auxiliary load of the aircraft when an alternate power source is available.

The term 'ground operation' used herein refers to aircraft handling activities at the airport including movement, traffic management and power management of a fleet of aircrafts. The term 'sensor data' refers to data acquired by a plurality of sensors such as cameras, speed sensors, and directional sensors. The term 'vehicle' refers to a taxi, a tug or a tractor suitable for taxiing an aircraft in an airport after landing and before takeoff operations. The term 'fleet of aircrafts' refers to a plurality of aircrafts moving in and out of an airport approximately during the day. The term 'environmental parameter' refers to a parameter value associated with a set of legal behavior of the system and a plurality of control guidance recommendations. The term 'contextual parameter' refers to any parameter value related to a vehicle using the airport. For example, the contextual parameters include vehicle speed and vehicle status. The term ' supervisory system' refers to a distributed system around the airport involving sensors, data transmission and data reception subsystems for collecting a variety of data related to stationary objects and moving vehicles in the airport. The term 'control parameter' refers to signals, alerts or a real value representative of an action to be performed by a vehicle, or by the traffic control center of the airport. The term 'auto-taxi response' refers to automatically generated taxiing control signals for navigating the vehicle in the airport. The terms 'pilot response' and 'manual response guidance' are used equivalently and interchangeably and refer to control signals generated by a human operator in response to the alert signals and other sensor inputs useful for navigating the vehicle in the airport. The term 'power source' refers to a mobile energy source accommodated in the vehicle for providing power to a variety of requirements of the aircraft.

FIG. 1 is a schematic 100 illustrating a ground management system for aircraft that includes a plurality of vehicles 114, 116 configured to engage a plurality of aircrafts (not shown in figure) for taxiing before takeoff and after landing. Each of the vehicles is provided with a plurality of sensors and configured to acquire sensor data. The sensor data is used by a collision avoidance system disclosed herein to prevent collision of the aircraft with stationary or moving objects near the aircraft. The vehicles provide vehicle status 118 to a traffic control center 102. The vehicle status 118 includes parameters such as position, velocity, and acceleration of the vehicles 114, 116. The traffic control center 102 is communicatively coupled to the vehicles via corresponding aircrafts operating in the airport. The traffic control center 102 includes a central controller 104 and a communication gateway 106 communicatively coupled to the central controller 104. The central controller 104 receives a set of inputs such as airport layout 108, airport traffic rules 110, and airport traffic status 112. A fleet management system disclosed herein monitors the vehicles 114, 116 and provides supervisory control to generate traffic guidance 120 to manage the fleet of aircrafts.

Each of the vehicles 114, 116 also includes a power source and is configured to provide power to a corresponding aircraft using a power management system disclosed herein. For illustration purposes, a power source 122 fitted in the vehicle 114 is shown and power source in the other vehicle 116 is not shown. The power management system is communicatively coupled to an on-board power system of each aircraft and is configured to perform activities related to energy management of each aircraft during taxiing or when stationed in a portion of the airport away from the terminal The power management activities include, but are not limited to, powering auxiliary loads, information exchange related to energy management, connecting and disconnecting the power source to the auxiliary loads of the aircraft, load management, power generation and power distribution.

Figure 2:
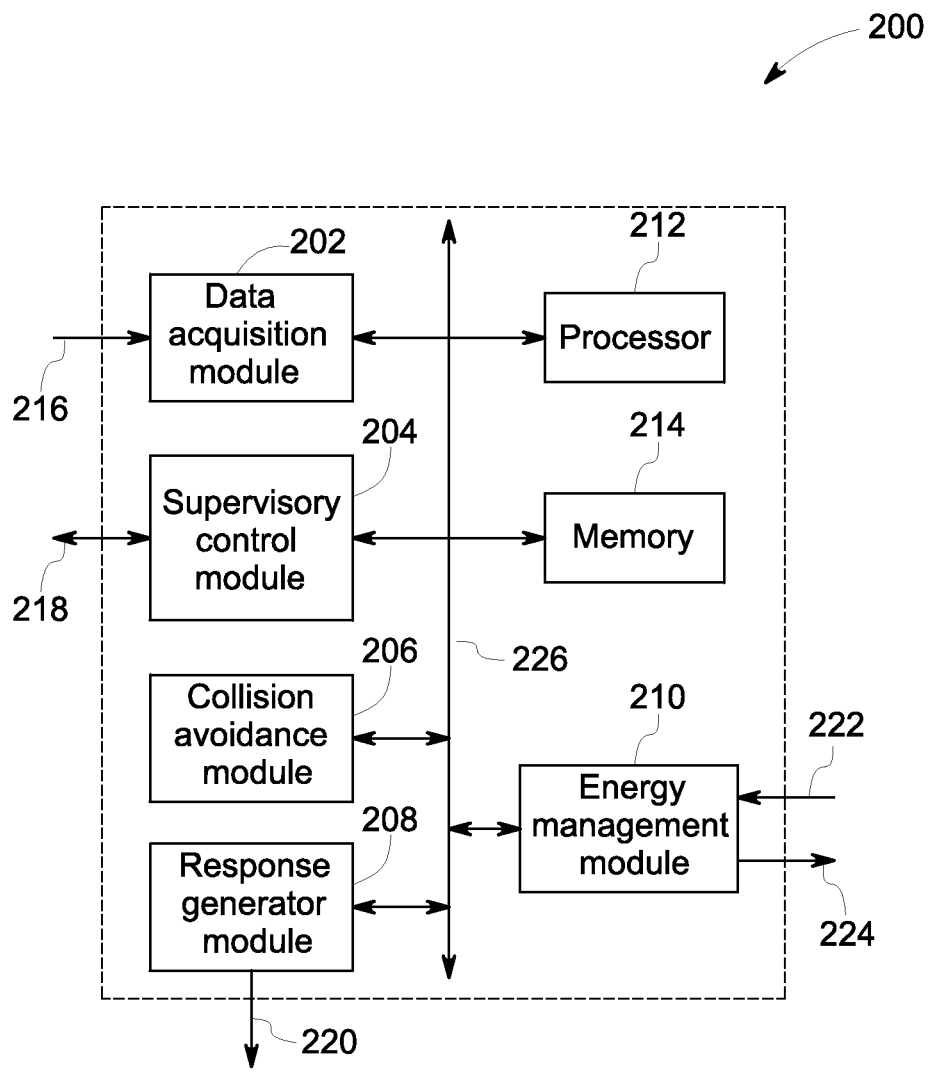
FIG. 2 is a schematic of a system for aircraft fleet management in accordance with an exemplary embodiment.

FIG. 2 is a block diagram of a system 200 for ground management of aircraft that includes a data acquisition module 202, a supervisory control module 204, a collision avoidance module 206, a response generator module 208, and an energy management module 210. The system also includes a processor 212 and a memory 214 communicatively coupled to the processor 212 and other modules 202, 204, 206, 208, 210 via a communications link 226.

The data acquisition module 202 is communicatively coupled to a plurality of sensors and receives sensor data 216 having information to perform management of ground operation of an aircraft. The plurality of sensors are disposed on a vehicle 14, 16 designed to engage an aircraft for taxiing. The sensor data 216 includes image data, and video data acquired from a plurality of image sensors disposed on the vehicle. The video data is acquired with a high frame rate and is processed for identification of obstacles in the surroundings of the vehicle. The sensor data 216 also includes a plurality of signals acquired from other types of sensors such as proximity sensors, position sensors, and RF sensors. The data acquisition module 202 acquires data about the status of the vehicle, traffic information in the airport and other dynamic data required for avoiding aircraft collision, aircraft fleet management, and aircraft power management tasks disclosed herein. Although the data acquisition module 202 is illustrated as a single module in the figure, in some embodiments, each vehicle may have one data acquisition module and the traffic control center 102 of FIG. 1 may have a separate data acquisition module. In such embodiments, data acquisition modules operating independently are configured to exchange information between them. The data acquisition module 202 includes components and circuitry required for transmission and reception of data with reference to the system 200.

The data acquisition module 202 receives sensor data such as position information, velocity, and acceleration, and processed information of surrounding environment from the vehicle. The data acquisition module receives data such as airport layout, airport traffic rules, specifications of the vehicles operating in the airport, and safety requirements from the traffic control center. The data acquisition module receives dynamic data related to the airport such as traffic status, traffic congestion level, weather status, and real time information about the arrival and departure of aircrafts. The traffic status 112 includes a parameter representative of traffic congestion level. The traffic status 112 may also include parameters representative of weather status, and airspeed at the airport. The set of inputs include, but is not limited to, vehicle specifications, and safety requirements.

The supervisory control module 204 is communicatively coupled to the data acquisition module 202 and configured to receive environment data from at least one of a gate, a service vehicle, a taxi vehicle, another aircraft, and a control center and determine a plurality of environmental parameters 218. The plurality of environmental parameters are based on a plurality of constraints such as airport traffic rules, airport traffic status, safety requirements, and airport layout. The plurality of environmental parameters 218 are used to perform supervisory control and monitoring operations. The supervisory control module 204 is configured to process the sensor data 216 to determine a state of the system and generate at least one legal behavior for the determined state of the system. For example, system behavior that violates separation requirements between the aircraft and another object near to it is represented by one set of discrete states. In another example, an imminent blocking condition of the vehicle is represented by another set of discrete states.

The supervisory control module 204 generates supervisory control and monitoring guidelines based on a system model, a requirement control policy and an objective control policy. The system model is determined by discretizing continuous system variables and using other data received by the data acquisition module. The term discretization used herein refers to process of representing a continuous variable by a non-continuous or discreet variable. The system model generated by the supervisory control module is specific to a particular sampling frequency, vehicle velocity range, system layout decomposition, and state transition model representation of system dynamics. The requirement control policy is based on the system requirements and provides supervisory control and monitoring logic to the system model. The objective control policy is representative of the objectives of the airport and constraints imposed by the airport layout and safety guidelines. The supervisory control module integrates the requirement control policy and the objective control policy with the system model to generate a control guidance. The term control guidance refers to an integrated policy for supervision and monitoring of vehicles in the airport and is represented by a plurality of environmental parameters.

The collision avoidance module 206 is communicatively coupled to the data acquisition module 202 and generates alert signals to avoid aircraft collision with an object near the vehicle taxiing the aircraft. The object includes, but is not limited to, a gate, a service vehicle, and another vehicle taxiing an aircraft in the airport. The collision avoidance module 206 is configured to receive sensor data corresponding to a vehicle from the data acquisition module in real time and determines one or more of the parameters representative of distance, motion of the aircraft, and motion of the object at a particular time instant. For example, the parameter determined by the collision avoidance module 206 is a distance parameter between the vehicle and the object. As another example, the parameter determined by the collision avoidance module 206 is at least one of speed, direction and acceleration of the aircraft during taxiing. In another example, the parameter determined by the collision avoidance module 206 is at least one of speed, direction, and acceleration of the object such as a service vehicle or the gate.

The collision avoidance module 206 compares each of the parameter with a corresponding pre-determined threshold and generates a binary value as the comparison result. The collision avoidance module is further configured to activate the response generator module based on the binary output and the parameter value. In some embodiments, the collision avoidance module is also communicatively coupled to the supervisory control module and configured to provide one or more parameters representative of vehicle parameter values and the binary output for traffic management at the airport.

The response generator module 208 is communicatively coupled to the supervisory control module 204 and the collision avoidance module 206 and generates a response signal 220 for fleet management of the plurality of aircrafts operating in the airport. The response generator module 208 receives sensor data acquired by the plurality of sensors disposed on the vehicle through the data acquisition module. The response generator module receives the plurality of environmental parameters from the supervisory control module. The response generator module receives one or more parameters, and the binary value from the collision avoidance module 206. The response generator determines a plurality of contextual parameter representative of status of the vehicle based on the sensor data and the plurality of environmental parameters. The response generator module further generates a response signal based on the plurality of contextual parameters and the plurality of environmental parameters. The response signal includes one or more control parameters useful for controlling the movement of the vehicle. The response generator initiates control actions based on the response signal directing the movement of the vehicle. The response signal generator is capable of managing the airport traffic by coordinating simultaneous movement of a plurality of vehicles.

The response generator operates in an auto-taxi mode or in a guided manual mode and generates an auto-taxi response and a manual response guidance, respectively. The response signal 220 is an automatic response generated by the response generator module 208 in auto-taxi mode. The response signal 220 is a manual response generated by the response generator module 208 in a guided manual mode. The response generator determines a recommendation for the vehicle comprising a status of the vehicle, a speed of the vehicle, a location of the vehicle, and a direction of movement of the vehicle. The control actions initiated by the response signal 220 include, but are not limited to, varying the speed of the vehicle, changing the route of the vehicle, stopping the vehicle, waiting, and reversing the vehicle. The recommendations from the response generator module and the control actions initiated by the response signal are usable for efficient traffic management of a fleet of aircrafts at the airport.

The energy management module 210 is communicatively coupled to the power source fitted in the vehicle and provides power to auxiliary loads of the aircraft. The energy management module is communicatively coupled to the auxiliary power source of the aircraft and receives information about the power requirement of the aircraft. The energy management module is further configured to supply required power to the auxiliary loads of the aircraft. The power source is based on electro-chemical batteries. The power source may be an electric power source or a fossil fuel based power generator. The power source may include a hybrid power source capable of generating power from two types of the power sources. The hybrid power source includes, but not limited to, more than one of batteries, super caps, regenerative braking, diesel engine, gasoline engine, gas turbine, and fuel cells. The auxiliary loads of the aircraft include, but are not limited to, aircraft exterior lights, interior cabin lighting, air-conditioning loads, and entertainment requirements. The auxiliary loads also include communication, instrumentation, monitoring and warning systems, as well as fuel gauges and pumps.

The energy management module connects the power source to the auxiliary loads via an on-board power system. The energy management module transmits the power to the auxiliary power source, performs power management of the aircraft and stops the power transmission when an alternate power source is available to the aircraft. The alternate power may be available when the aircraft engine is in operation. The alternate power may be a ground power made available to the aircraft when the aircraft is near the gate, or in the terminal. The energy management module disconnects the power source from the aircraft when an alternate energy source is available to the on-board power system. Connecting the power source includes engaging the vehicle to the aircraft before taxiing. Disconnecting the power source includes disengaging the vehicle from the aircraft at the end of taxiing.

The power management module generates power required for auxiliary loads of the aircraft. The power management module recovers energy during regenerative braking of the aircraft during taxiing. The power management module enables transfer of information between the power source and the on-board power system. Other power management activities such as power generation, and power distribution, may also be performed by the power management module.

The processor 212 may include one or more processors. The terms 'processor', 'one or more processors' and 'processor' are used equivalently and interchangeably herein in subsequent paragraphs. The one or more processors 212 includes at least one arithmetic logic unit, a microprocessor, a general purpose controller or a processor array to perform the desired computations or run the computer program. The functionality of the one or more processors 212 may be limited to acquire the sensor data. The functionality of the one or more processors 212 may be limited to perform supervisory control and monitoring operations. The functionality of the one or more processors 212 may be limited to avoiding air craft collision. The functionality of the one or more processors 212 may be limited to generating response for controlling the aircraft movements. The functionality of the one or more processors 212 may be limited to the energy management of the aircraft. Functionality of the one or more processors 212 may include one or more of the functions of the data acquisition module 202, supervisory control module 204, collision avoidance module 206, response generator module 208, and energy management module 210.

While the processor 212 is shown as a separate unit, there can be a processor co-located or integrated in one or more of the modules. Alternatively, one or more processors 212 can be local or remote, such as a central server or cloud based, and the communications link may be a computer bus, a wired link, or a wireless link or a combination thereof. The data acquisition module 202 may be fitted to the vehicles 14, 16. One data acquisition module may be located in the vehicle 14, 16 and another data acquisition module may be located in the traffic control center 102. The collision avoidance module 206 and the response generator module 208 may be disposed in the vehicle. The supervisory control module 204 may be located in the traffic control center 102 of FIG. 1.

The memory 214 may be a non-transitory storage medium. For example, the memory 214 may be a dynamic random access memory (DRAM) device, a static random access memory (SRAM) device, flash memory or other memory devices. In one embodiment, the memory may include a non-volatile memory or similar permanent storage device, media such as a hard disk drive, a floppy disk drive, a compact disc read only memory (CD-ROM) device, a digital versatile disc read only memory (DVD-ROM) device, a digital versatile disc random access memory (DVD-RAM) device, a digital versatile disc rewritable (DVD-RW) device, a flash memory device, or other non-volatile storage devices. A non-transitory computer readable medium may be encoded with a program to instruct the one or more processors to perform fleet management and power management of a fleet of aircrafts during ground operation.

At least one of the data acquisition module 202, supervisory control module 204, collision avoidance module 206, response generator module 208, and energy management module 210 is stored in the memory 214 and is executable by the at least one processor 212. At least one of the modules 202, 204, 206, 208, 210 may be a standalone hardware module. Other hardware implementations such as FPGA, ASIC or customized chip may be employed for one or more of the modules of the system 200.

Figure 3:
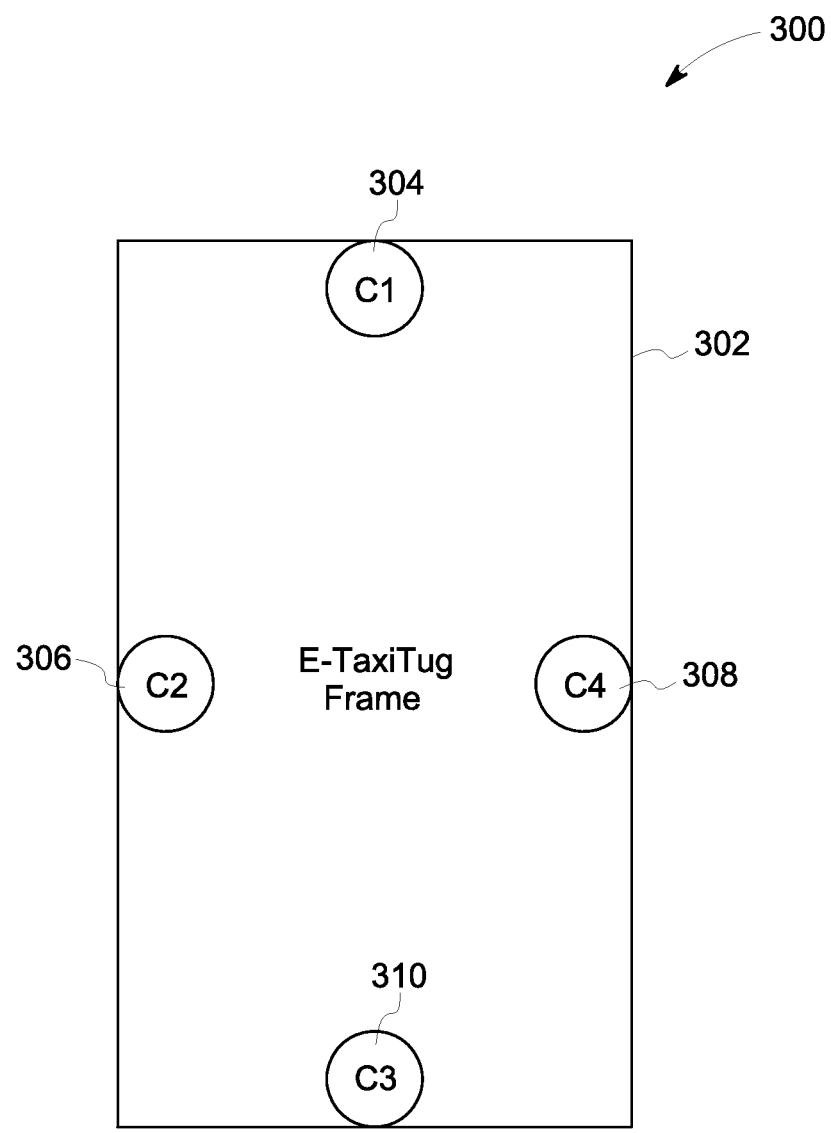
FIG. 3 is a schematic of a vehicle used for taxiing an aircraft in accordance with an exemplary embodiment.

FIG. 3 is a schematic of a vehicle 300 used for taxiing an aircraft that includes a chassis 302 mounted on wheels (not shown in the figure). A plurality of sensors 304, 306, 308, 310 are disposed on the chassis 302 of the vehicle. Although four sensors are illustrated in the figure, more than four sensors may be used and the sensors may be located anywhere on the chassis 300. The plurality of sensors 304, 306, 308, 310 may be image sensors, video sensors, RF sensors or any other type of sensors capable of generating an image of the surroundings of the vehicle. The plurality of sensors may also include other types of sensors for measuring parameters such as temperature, speed, and separation distance.

Figure 4:
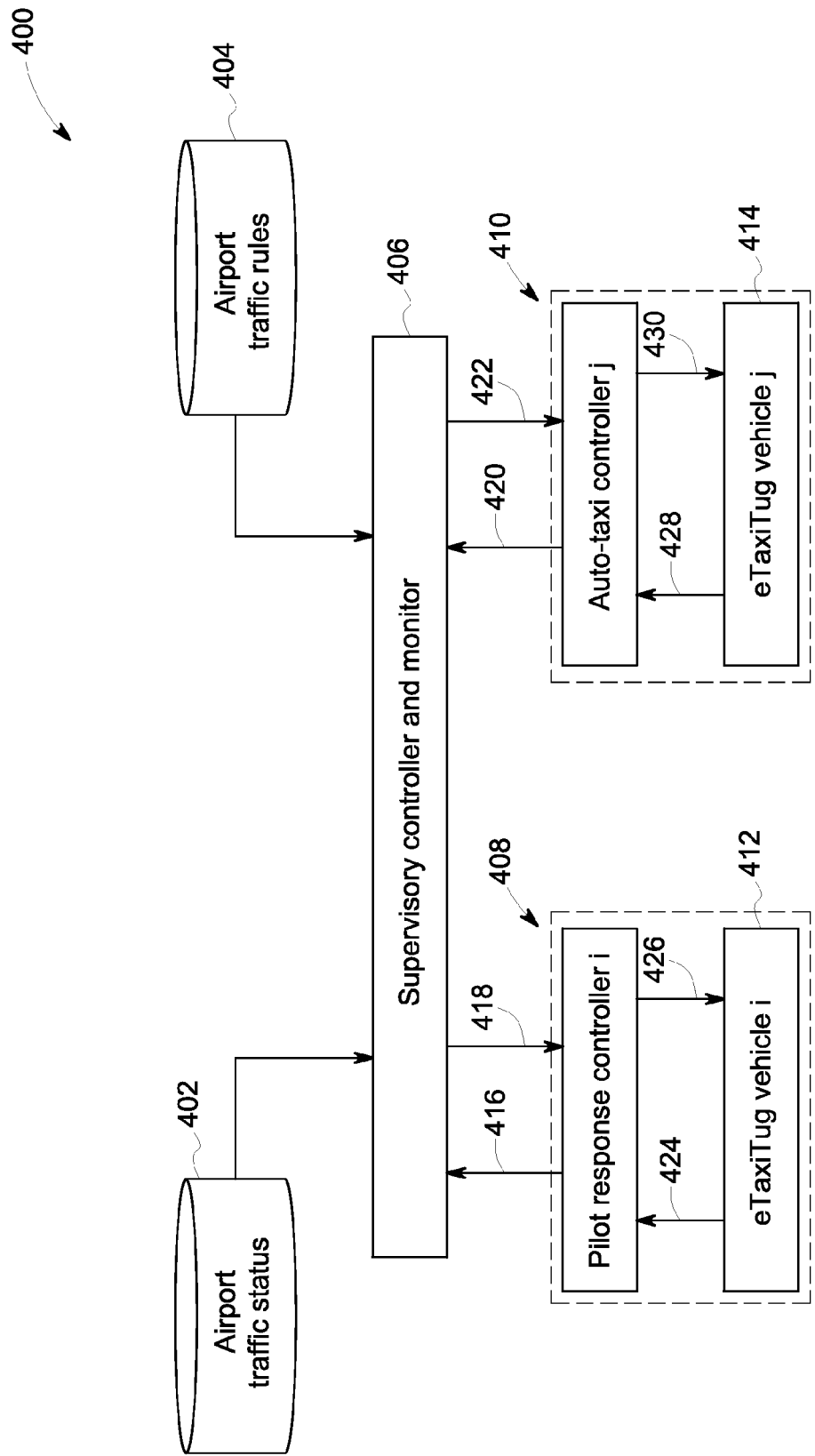
FIG. 4 is schematic of system architecture in accordance with an exemplary embodiment.

FIG. 4 is schematic of system architecture 400 designed with respect to a plurality of vehicles 412, 414 operating from an airport. The system architecture includes a supervisory controller and monitor 406, a plurality of response controllers 408, 410 corresponding to the plurality of vehicles 412, 414 respectively. The supervisory controller and monitor 406 receives static data and dynamic data related to the airport such as airport traffic status 402, and airport traffic rules 404 to generate the control action for guiding the vehicles. The supervisory controller and monitor 406 also receive response from the response controller to generate traffic guidance. The supervisory controller and monitor also receives status of vehicles, such as location, speed, and direction of movement. The supervisory controller and monitor 406 generate control actions 418, 422 corresponding to the plurality of vehicles 412, 414 and provides them to the response controllers 408, 410, respectively. The response controllers 408, 410 are configured to operate either in the auto-taxi mode or in guided manual mode. In the illustration, the response controller 408 corresponding to the vehicle 412 is operating in the guided manual mode and the response controller 410 corresponding to the vehicle 414 is operating in the auto-taxi mode. The response controllers 408, 410 receive vehicle status 424, 428 corresponding to the vehicles 412, 414 and provide them the control actions 426, 430. The auto-taxi mode is a default response generated by the response controllers 408, 410. The guided manual mode may override the default response of the controllers.

Figure 5:
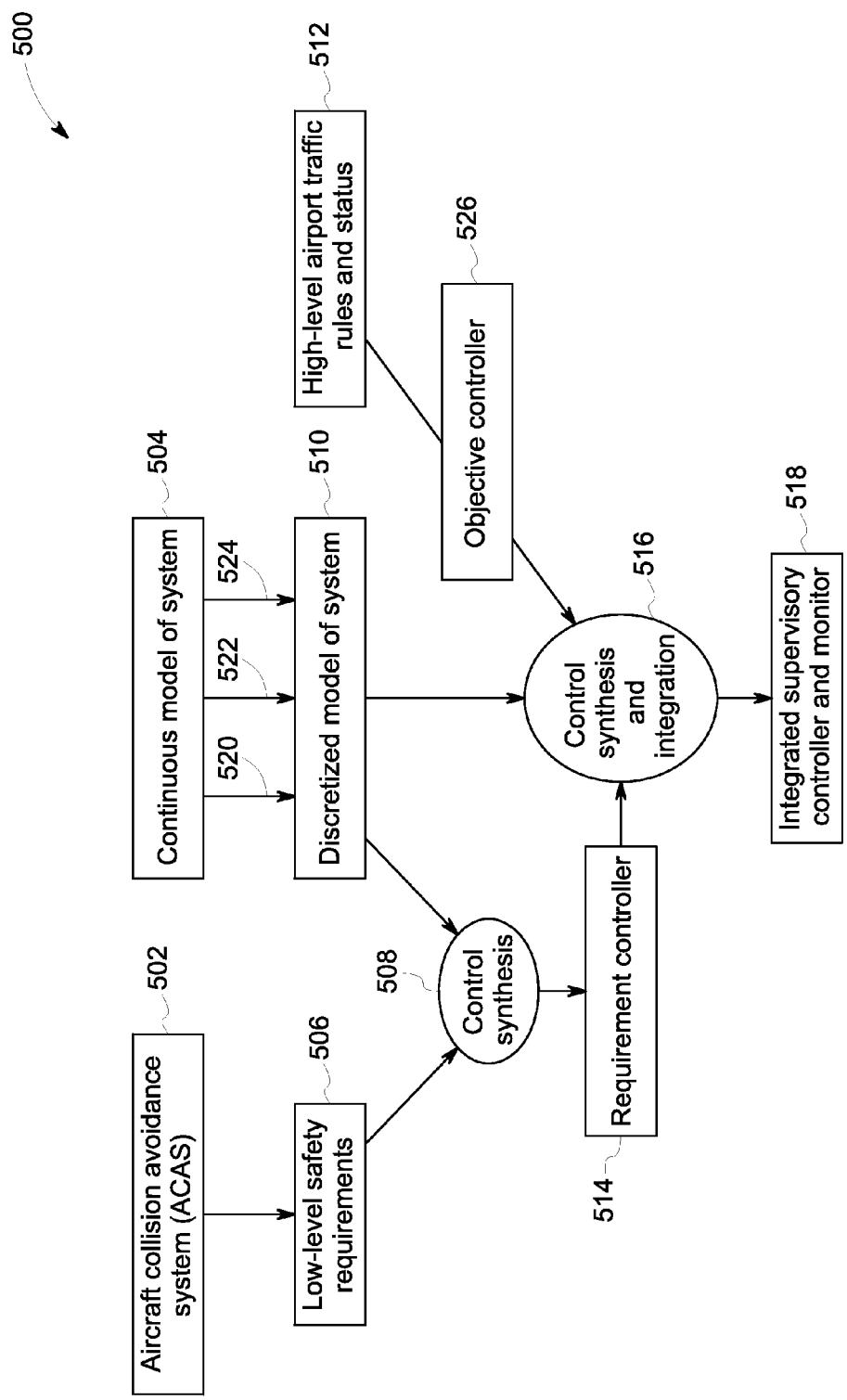
FIG. 5 is a schematic of a supervisory control and monitor system in accordance with an exemplary embodiment.

FIG. 5 is a flow diagram 500 that illustrates low level requirements 506 and high level requirements 512 for development of the supervisory controller and monitor 406 of FIG. 4. The low level requirements 506 provide safety requirements such as a lower limit for a separation to avoid collision of aircraft with an object in the airport. The low level requirements 506 also include a description for a non-blocking state to avoid deadlock. The high level requirements 512 include, but are not limited to, aircraft traffic rules and traffic status constraints. A discretized model 510 is developed for ground management system of FIG. 1 by discretizing continuous model 504. The discretized model 510 is developed based on architecture and specifications of the ground management system, components and layout of the airport, specifications on vehicle dynamics, specifications of vehicle controllers, uncertainty in communications, and safety requirements. The development of the discretized model 510 employs discretization of time 520, discretization of vehicle velocity 522, and discretization of vehicle position 524. A plurality of other variables such as sampling frequency, velocity range of the vehicles, state transition model representation of system dynamics are also involved in discrete model development. The discretization of time 520 provides a set of control actions, the discretization of vehicle velocity 522 provides a set of control actions, and discretization of vehicle position 524 provides a characterization of separation and non-blocking requirements.

A requirement controller 514, for low level requirements, imposes supervisory control logic upon the discretized model 510. The requirement controller 514 is developed by performing control synthesis 508 of the low level control requirements 506 and the discretized model 510. The requirement controller 514 represents at least one of a plurality of system behaviors comprising separation violation, and blocking condition by a finite set of discrete states. The requirement controller 514 is configured to enable and disable the state transitions. An objective controller 526 imposes the objective of airport traffic rules and airport traffic constraints on to the discretized model 510. The objective controller 526 represents at least one of a plurality of system behaviors related to the airport objectives. The supervisory controller and monitor 518 is developed by performing control synthesis integration 516 of the requirement controller 514 and the objective controller 526.

Figure 6:
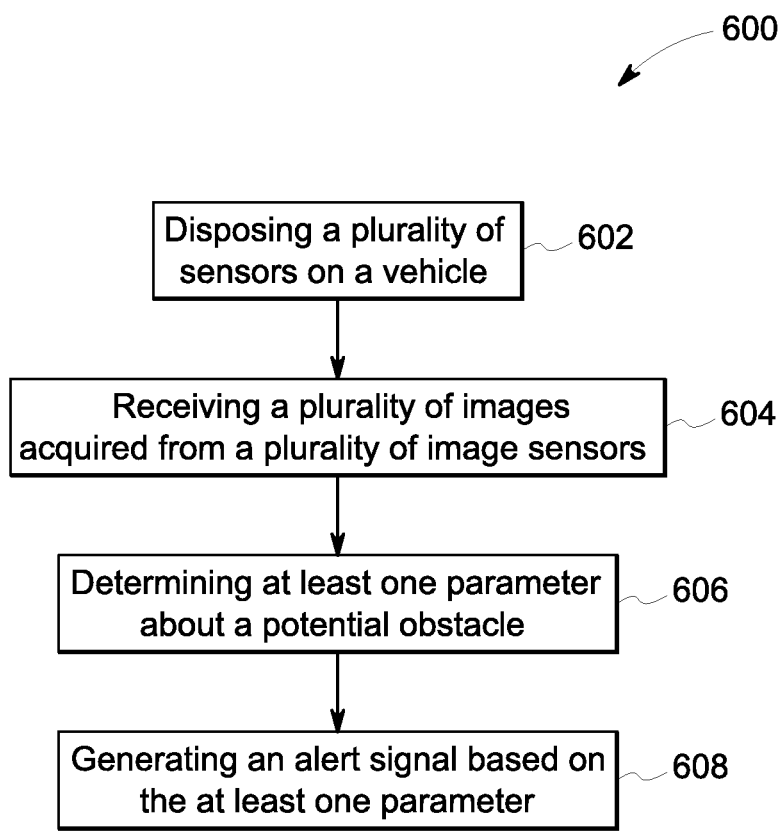
FIG. 6 is a flow chart illustrating a method for collision avoidance of an aircraft in accordance with an exemplary embodiment.

FIG. 6 is a flow chart illustrating a method 600 for collision avoidance of an aircraft that includes disposing a plurality of sensors at a plurality of locations on a vehicle 602, wherein the plurality of sensors comprises a plurality of image sensors. The vehicle comprises at least one of a tractor, a tug, a taxi, or any other vehicle configured to engage an aircraft for taxiing in an airport. The plurality of sensors include at least one of an image sensor, a proximity sensor, and a radio frequency sensor. It should be noted herein that the vehicle may include any other type of sensor suitable for acquiring data usable for avoiding collision of the aircraft. The plurality of sensors may be disposed at front of the vehicle, back of the vehicle, left side of the vehicle, right side of the vehicle, top of the vehicle and bottom of the vehicle.

The method further includes receiving 604 a plurality of images acquired from the plurality of image sensors. The receiving 604 may include acquiring and receiving a video by a video camera in real time with a plurality of frame rates high enough to identify objects captured in the video. The plurality of images and the captured video may include potential obstacles around the aircraft during taxiing. A frame rate may be about twenty-five frames per second. A frame rate may be about 30 frames per second is used to acquire the video. The video or the image data is referred herein as sensor data. It should be noted that the sensor data also includes other types of data acquired from other types of sensors fitted to the vehicle.

The method also includes determining 606 at least one parameter about the potential obstacles based on the plurality of images, the video captured in real time and/or other types of data. The determining 606 is based on the sensor data and a machine vision algorithm. The at least one parameter may include, but is not limited to, a distance value, a velocity value, an acceleration value, and a direction parameter. More specifically, the distance value is a distance between the vehicle and the potential obstacle at a given time instant. The velocity value is a relative velocity of the vehicle with respect to the potential obstacle at a given time instant. The acceleration value is a relative acceleration of the vehicle with reference to the potential obstacle. The direction parameter is a relative direction of the vehicle with reference to the potential obstacle. The terms 'potential obstacle' or 'obstacle' are used herein equivalently and interchangeably and refers to at least one of a gate, a service vehicle and another aircraft taxiing in the airport with the help of another vehicle.

The determining 606 also includes identifying one or more of the potential objects and their relative positions based on a plurality of image processing techniques. The image processing techniques include, but are not limited to, an image registration, an image segmentation, motion analysis, edge detection, pattern recognition and comparison operations. The image processing techniques enable determination of a collision condition based on the at least one parameter. The collision condition may be represented by a signal having information usable to initiate a condition to mitigate the collision condition. It should be noted herein that the collision condition also includes a blocking condition. The method 600 further includes generating 608 an alert signal based on the collision condition. The alert signal may be used for avoiding collision of aircraft on the ground with the potential obstacle. The alert signal may include, but is not limited to, an audible signal, a visual signal, a tactile signal, and an electrical signal indicative of the collision condition.

Figure 7:
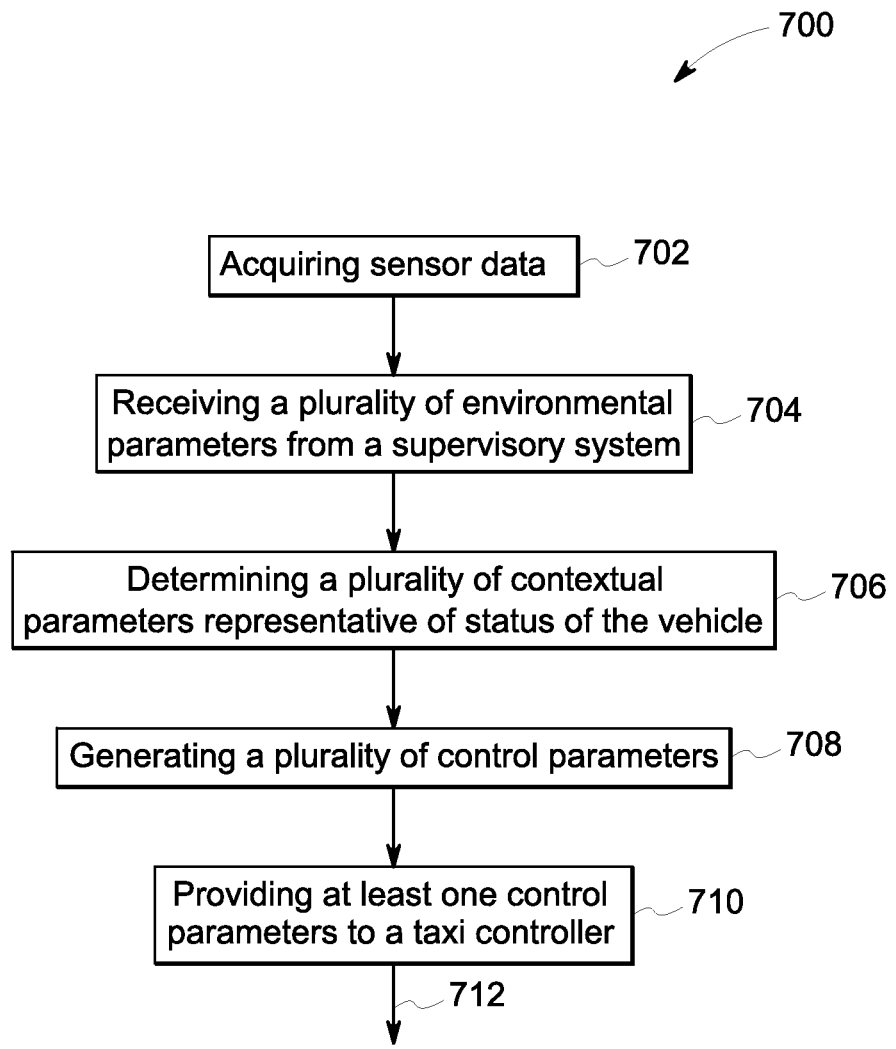
FIG. 7 is a flow chart illustrating a method for aircraft fleet management in accordance with an exemplary embodiment and FIG. 8 is a flow chart of a method for power management of an aircraft in accordance with an exemplary embodiment.

FIG. 7 is a flow chart illustrating a method 700 for aircraft fleet management that includes acquiring sensor data 702 from a plurality of sensors disposed on a vehicle configured to engage an aircraft for taxiing, wherein the aircraft is a member of a fleet of aircrafts. The method of fleet management includes receiving 704 a plurality of environmental parameters from a supervisory system. The supervisory system offers supervisory control and monitor services for fleet management of aircrafts. The supervisory system is configured to receive data from at least one of a gate, a service vehicle, a taxi vehicle, and a control center. The supervisory system is also configured to manage the fleet of aircrafts by providing traffic guidance to the moving vehicles. The plurality of environmental parameters include, but not limited to, airport traffic rules, airport traffic status, safety requirements, airport traffic guidance, and airport layout. Some of the environmental parameters are retrieved from a database or a pre-determined memory location.

The method of fleet management also includes determining 706 a plurality of contextual parameters representative of status of the vehicle based on the sensor data, and the plurality of environmental parameters. The plurality of contextual parameters include, but are not limited to, at least one of a vehicle status, vehicle speed, direction of movement of the vehicle. The determining 706 may also include providing at least one of the plurality of contextual parameters to the supervisory system. The method 700 further includes generating 708 a plurality of control parameters based on the plurality of contextual parameters and the plurality of environmental parameters. The plurality of control parameters may include an auto-taxi response and a guided manual response.

The auto-taxi response comprises an automatically generated action based on the plurality of control parameters. The amplitude and type of one or more of the control parameters are used to generate one or more actuating signals in time synchronism. The guided manual response comprises one or more actions initiated by pilot or taxiing vehicle driver based on the auto-taxi response, the plurality of contextual parameters and the plurality of environmental parameters. The pilot or the taxiing vehicle driver may initiate an alternate action other than suggested by the auto-taxi mode. The pilot may alter the timing of actuating signals generated by the auto-taxi response. The plurality of control parameters are provided 710 to a taxi controller of the aircraft. A fleet management signal 712 is generated by the taxi controller for management of the fleet of aircrafts.

Figure 8:
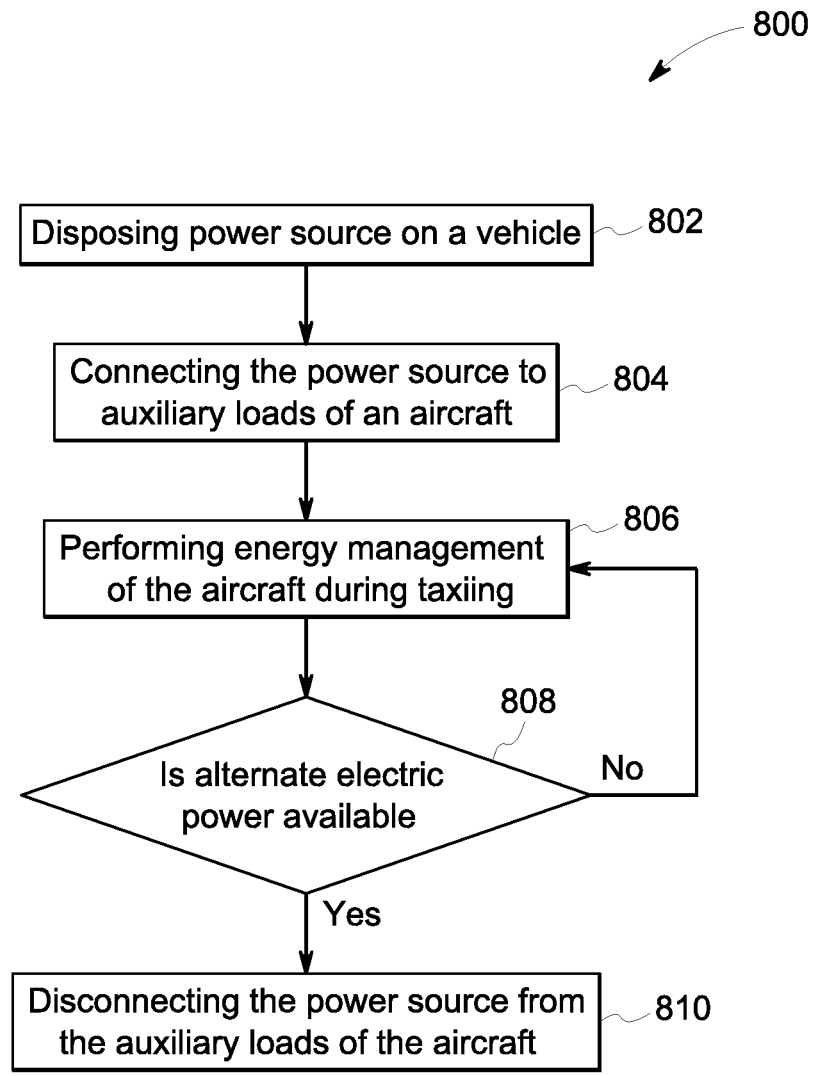

FIG. 8 is a flow chart of a method 800 for power management of an aircraft that includes disposing 802 a power source in the vehicle. The power source is configured to power auxiliary loads of the aircraft. The power source may be based on the fossil fuels or the power source may be based on electro chemical power source. The power source may be an electric power source. The method of power management further includes connecting 804 the power source to the auxiliary loads of the aircraft. The connecting includes physically engaging the vehicle with the aircraft and generating power required for the auxiliary loads of the aircraft.

The method of power management further includes performing 806 energy management of the aircraft during taxiing. The power management comprises determining the power need of the aircraft at a time instant. The power management also includes controlling the amount of power generated by the power source and transferring the power to the auxiliary loads. The power management also includes exchange of information between the vehicle and the aircraft required for efficient supply of power from the vehicle to the on-board power system in the aircraft. The power management also includes distribution of power to the auxiliary loads of the aircraft. The power management includes providing power to cabin lighting system, air-conditioning system, entertainment system, and communication system of the aircraft.

The power management system also includes checking 808 availability of an alternative power source to the aircraft at regular intervals. The power management 806 is continued when an alternative power source is not available to the aircraft. When an alternate power source is available, the power source is disconnected 810 from the auxiliary power source of the aircraft. The disconnecting may include physically disengaging the aircraft from the vehicle.

The present techniques avoid collision of aircrafts with service vehicles and moving or stationary objects during ground operation. The use of the vehicle for taxiing eliminates damage of aircraft engine due to foreign particles. The disclosed techniques avoid traffic congestion in the airport and save fuel and reduce the cost of maintenance. The present techniques also reduce emission and provide an environmental friendly approach to the aircraft ground management at the airport.

It is to be understood that not necessarily all such objects or advantages described above may be achieved in accordance with any particular embodiment. Those skilled in the art will recognize that the systems and techniques described herein may be embodied or carried out in a manner that achieves or improves one advantage or group of advantages as taught herein without necessarily achieving other objects or advantages as may be taught or suggested herein.

While the technology has been described in detail in connection with only a limited number of embodiments, it should be readily understood that the claimed inventions are not limited to such disclosed embodiments.

The invention claimed is:

1. A collision avoidance system comprising:
   at least one processor and a memory communicatively coupled to the at least one processor via a communications link;
   a plurality of sensors disposed at a plurality of locations on a taxi vehicle taxiing an aircraft, wherein the plurality of sensors comprises a plurality of image sensors and the taxi vehicle is configured to engage an aircraft for ground operations;
   a data acquisition module communicatively coupled to the plurality of sensors that receives a plurality of images from the plurality of image sensors;
   a supervisory control module communicatively coupled to the data acquisition module and configured to:
   receive environmental data from at least one of a gate, a service vehicle, a taxi vehicle, another aircraft, and a control center;
   determine a plurality of environmental parameters based on the environmental data and a discretized model, wherein the plurality of environmental parameters are used to perform supervisory control and monitoring operations and wherein the discretized model is based on architecture and specifications of a ground management system, components and layout of an airport, specifications on vehicle dynamics, specifications of vehicle controllers, uncertainty in communications, and safety requirements; and
   a collision avoidance module configured to determine a signal indicative of a collision condition, wherein the collision avoidance module is communicatively coupled to the data acquisition module and that:
      determines at least one parameter about an obstacle based on the plurality of images, the plurality of environmental parameters and a machine vision algorithm, wherein the obstacle is a stationary or a moving object disposed near the taxi vehicle; and
      generates an alert signal based on the at least one parameter, wherein the alert signal is indicative of the collision condition, and wherein the alert signal is used for avoiding collision of the aircraft with the obstacle;
   wherein at least one of the data acquisition module and the collision avoidance module is stored in the memory and executable by the at least one processor.

2. The system of claim 1, wherein the plurality of sensors comprises at least one of a proximity sensor and a radio frequency sensor.

3. The system of claim 1, wherein the data acquisition module acquires a real time video at a plurality of frame rates.

4. The system of claim 1, wherein the collision avoidance module determines a distance value, a velocity value, an acceleration value and a direction parameter as the at least one parameter.

5. The system of claim 1, wherein the collision avoidance module identifies at least one of a gate, a service vehicle, and another aircraft as the obstacle.

6. The system of claim 1, wherein the collision avoidance module performs at least one of registration, segmentation, motion analysis, edge detection, and pattern recognition operation.

7. The system of claim 1, wherein the collision avoidance module identifies a blocking condition.

8. The system of claim 1, wherein the alert signal comprises at least one of an audible signal, a visual signal, a tactile signal, an electrical signal indicative of the collision condition.

9. A method for collision avoidance comprising:
   receiving a plurality of images acquired from a plurality of sensors disposed on a taxi vehicle taxiing the aircraft, wherein the taxi vehicle is configured to engage an aircraft for ground operations;
   receiving environmental data from at least one of a gate, a service vehicle, a taxi vehicle, another aircraft, and a control center;
   a plurality of environmental parameters based on the environmental data and discretization of time, discretization of a vehicle velocity, and discretization of a vehicle position, wherein discretization of time, discretization of the vehicle velocity, and discretization of the vehicle position is based on architecture and specifications of a ground management system, components and layout of an airport, specifications on vehicle dynamics, specifications of vehicle controllers, uncertainty in communications, and safety requirements; and
   determining at least one parameter about an obstacle by a processor communicatively coupled to the plurality of image sensors, based on the plurality of images, the plurality of environmental parameters and a machine vision algorithm, wherein the obstacle is a stationary or moving object disposed near the vehicle; and
   generating an alert signal based on the at least one parameter by the processor, wherein the alert signal is indicative of the collision condition, and wherein the alert signal is used for avoiding collision of the aircraft with the obstacle near the vehicle.

10. The method of claim 9, wherein the plurality of sensors includes at least one of proximity sensor and a radio frequency sensor.

11. The method of claim 9, wherein receiving comprises acquiring a video in real time with a plurality frame rates.

12. The method of claim 9, wherein determining comprises computing at least one of a distance value, a velocity value, an acceleration value, a direction parameter.

13. The method of claim 9, wherein determining comprises computing the at least one parameter corresponding to at least one of a gate, a service vehicle, and another aircraft.

14. The method of claim 9, wherein determining comprises performing at least one of registration, segmentation, motion analysis, edge detection, and pattern recognition operations.

15. The method of claim 9, wherein determining comprises identifying a collision condition of the vehicle.

16. The method of claim 15, wherein the collision condition comprises a blocking condition.

17. The method of claim 15, wherein generating comprises determining at least one of an audible signal, a visual signal, a tactile signal and an electrical signal indicative of the collision condition.

18. The system of claim 1, wherein the discretized model employs discretization of time, discretization of a vehicle velocity, and discretization of a vehicle position.

* * * * *